(12) United States Patent
Egigian

(10) Patent No.: US 11,414,005 B2
(45) Date of Patent: Aug. 16, 2022

(54) OFFSET FASTENER

(71) Applicant: Bestop BullRing, LLC, Louisville, CO (US)

(72) Inventor: Donald S. Egigian, Boerne, TX (US)

(73) Assignee: Bestop BullRing, LLC, Louisville, CO (US)

( * ) Notice: Subject to any disclaimer, the term of this patent is extended or adjusted under 35 U.S.C. 154(b) by 279 days.

(21) Appl. No.: 16/869,993

(22) Filed: May 8, 2020

(65) Prior Publication Data
US 2020/0353856 A1 Nov. 12, 2020

Related U.S. Application Data

(60) Provisional application No. 62/845,104, filed on May 8, 2019.

(51) Int. Cl.
*B60P 7/08* (2006.01)
(52) U.S. Cl.
CPC .................................. *B60P 7/0807* (2013.01)
(58) Field of Classification Search
CPC ........... B60P 7/0807; B60P 7/08; B61D 45/00
USPC ................ 410/101, 107, 102, 103, 108–116; 296/40
See application file for complete search history.

(56) References Cited

U.S. PATENT DOCUMENTS

| | | | | |
|---|---|---|---|---|
| 4,715,754 A | * | 12/1987 | Scully | B61D 45/007 410/101 |
| D408,267 S | * | 4/1999 | Egigian | D8/354 |
| 6,065,917 A | * | 5/2000 | Shambeau | B60P 7/0807 410/112 |
| 6,665,911 B1 | * | 12/2003 | Huang | B60P 7/0807 410/105 |
| 6,918,721 B2 | * | 7/2005 | Venton-Walters | B60P 7/0807 410/102 |
| 6,969,219 B2 | * | 11/2005 | Speece | B60P 7/0807 410/106 |
| 7,481,610 B1 | * | 1/2009 | Egigian | B60P 7/0807 410/106 |
| 9,193,294 B1 | * | 11/2015 | Egigian | B60P 7/0807 |
| 9,511,705 B1 | * | 12/2016 | Egigian | B60P 7/0807 |

* cited by examiner

*Primary Examiner* — D Glenn Dayoan
*Assistant Examiner* — Sunsurraye Westbrook
(74) *Attorney, Agent, or Firm* — Warn Partners, P.C.

(57) ABSTRACT

An anchor point for mounting on a hauling apparatus for securing a tie down line on an anchor ring, comprising an anchor ring mounting in an anchor ring housing. The anchor ring housing has a top flat plate member that is offset relative to the anchor ring so that its length extends farther from the anchor ring on one side of the anchor ring so it will fit flush in an opening in a hauling apparatus. The top flat member is offset relative to the transverse centerline of the anchor ring so that the distance from the transverse centerline and a longitudinal side of the top flat plate member is greater than the opposed longitudinal side of the top flat plate member. The anchor ring may be oriented at an acute angle from the top flat plate member or may be perpendicular to the top flat plate member.

20 Claims, 5 Drawing Sheets

OFFSET FASTENER

CROSS-REFERENCE TO RELATED APPLICATIONS

This application claims the benefit of U.S. Provisional Application No. 62/845,104, filed May 8, 2019. The disclosures of the above application are incorporated herein by reference.

FIELD OF THE INVENTION

The invention relates to the field of fastening rings that allow the securing of loads by lashings or lines to a truck or trailer bed, and more particularly but not exclusively to fastening rings that have retractable ring members to improve their appearance when not in use and to assure that elements are not interfering when not in use.

BACKGROUND OF THE INVENTION

Fastening rings for securing tie-down lines are commonly referred to as "tie-down anchor fixtures" or "anchor points" for short, anchor point being used as a noun in herein. It is described herein as a tie-down anchor fixture as an anchor point. Such anchor points are commonly used on trailers, pickup trucks, boats and other vehicles to secure articles and loads. An anchor point may be configured to have a ring member that is retracted when not in use and to be extended when in use to secure lines. In pickup trucks, such anchor points are installed in spaced openings in the top side walls of truck beds. A load, placed on the truck bed, is secured against movement using multiple anchor points for securing its lashings or lines on the loads. The openings in the top side walls of truck beds are generally square or rectangular. A decorative cap may be placed on the top side walls of truck beds with rectangular openings that generally correspond to the openings in in the top side walls of truck beds. The present invention accommodates openings in the decorative cap and in the top side walls of truck beds that do not align exactly.

U.S. Pat. No. 6,969,219 discloses a cargo anchor with a cover plate having a peripheral edge that is extensive for covering a panel aperture in the upward facing surface of a side wall of a truck. An anchor bar for securing an anchor line is engaged with the cover plate. A locator plate is fastened to the cover plate with screws and is positioned within a well associated with the panel aperture. The locator plate engages a flange tube within the truck sidewall, limiting movement of the cargo anchor so that a space between the panel aperture and the peripheral edge of the cover plate cannot occur.

U.S. Pat. No. 7,481,610 discloses a tie-down assembly that is engaged within a truck side wall pocket to enable attachment of ropes, cables, bungee cords and the like. A body has an open ring formation and a bottom surface with an indented cavity and a mounting hole extending therethrough. A mount has a flange laying in contact with the outside surface of the truck side wall, and further has a bottom panel having an upwardly extending ridge which extends into the indented cavity of the body. A clamp includes a clamp plate with legs in contact with the inside surface of the truck side wall. The clamp has a fastener receiver engaging a fastener extending through the body and the mount, and which can be adjusted to provide clamping forces through the legs and flange on opposing sides of the truck side wall to secure the assembly to the side wall.

U.S. Pat. No. 9,193,294 discloses a fastener for securing straps, that includes a base member defining a pair of anchor receiving holes, wherein the base member is configured to be engaged with a receiving frame in such a way that the base member faces an interior side of the receiving frame and axes of the anchor receiving holes define a non-normal angle with respect to the receiving frame. The fastener further includes an anchor comprising a pair of arms, wherein the arms are received by the anchor receiving holes at an acute angle, wherein the anchor is configured to traverse along the anchor receiving holes without being disengaged from the base member.

U.S. Pat. No. 9,511,705 discloses an anchor point that is mounted within an aperture of a wall of a molded strip wherein a recessed peripheral shoulder of the aperture receives a flange of the anchor point and fills the aperture flush with a top surface of the molding. A locking plate of the fastening system contacts the recessed shoulder which is therefore clamped between the locking plate and the flange. A ring of the fastening system is movable between an extended position for receiving a line, and a retracted position hidden below the top surface of the molding when not in use.

Accordingly, there exists a need for an anchor point assembly for mounting on a hauling apparatus for securing a tie down line on an anchor ring, comprising an anchor ring mounting in an anchor ring housing, and to accommodate openings in the decorative cap and in the top side walls of truck beds that do not align exactly.

SUMMARY OF THE INVENTION

In embodiments of the described and illustrated anchor points, fastening rings facilitating securing of loads are described. Such fastening rings may include parts: a top housing, a locking clip, a bottom housing, a u-shaped anchor ring with a locking pin. A pair of legs of the anchor ring slidably extend through clearance holes in the several parts so that the anchor ring is able to slide between an extended position for lashing and a retracted position flush with the top housing.

The anchor ring has a detente spring for holding it in the extended position where the spring force is easily overcome manually for stowing the anchor ring out of sight. The anchor point may be flush mounted in a truck side rail or decorative strip on top of the side rail where it is essentially out of sight when not in use.

The top plate member is offset relative to the anchor ring so that its length extends farther from the anchor ring on one side of the anchor ring so it will fit flush in an opening in a hauling apparatus. The top flat member is offset relative to the transverse centerline of the anchor ring so that the distance from the transverse centerline and a longitudinal side of the top flat plate member is greater than the opposed longitudinal side of the top flat plate member. This allows the top plate to fit flush with a decorative cap on the side wall of a bed for hauling.

The anchor ring may be oriented at an acute angle from the top flat plate member. Or alternatively the anchor ring may be oriented perpendicular to the top flat plate member.

The following detailed description includes references to the accompanying illustrations which form a part of this detailed description. Example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of what is defined and claimed. The following detailed description is, therefore, not to be taken as a limiting sense, and the scope is defined by the appended claims and their equivalents which are to be understood in their broadest possible sense.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention relates to an anchor point assembly 10, shown in FIGS. 1-4 and 6-8 for securing a tie down line such as straps, cords, ropes, wires and similar fastening materials to a truck or trailer bed. Anchor point 10 may be used as a tie-down fastening point on a vehicle such as an open bed truck, trailer or similar hauling apparatus where one or more of said anchor points 10 receives one end, or portion, of a line that extends between anchor points and extending over a load in the truck bed or trailer for securing the load and preventing it from shifting during transport. Anchor point 10 may also be used in other situations where a fastening point for a line is required.

Figure 1:
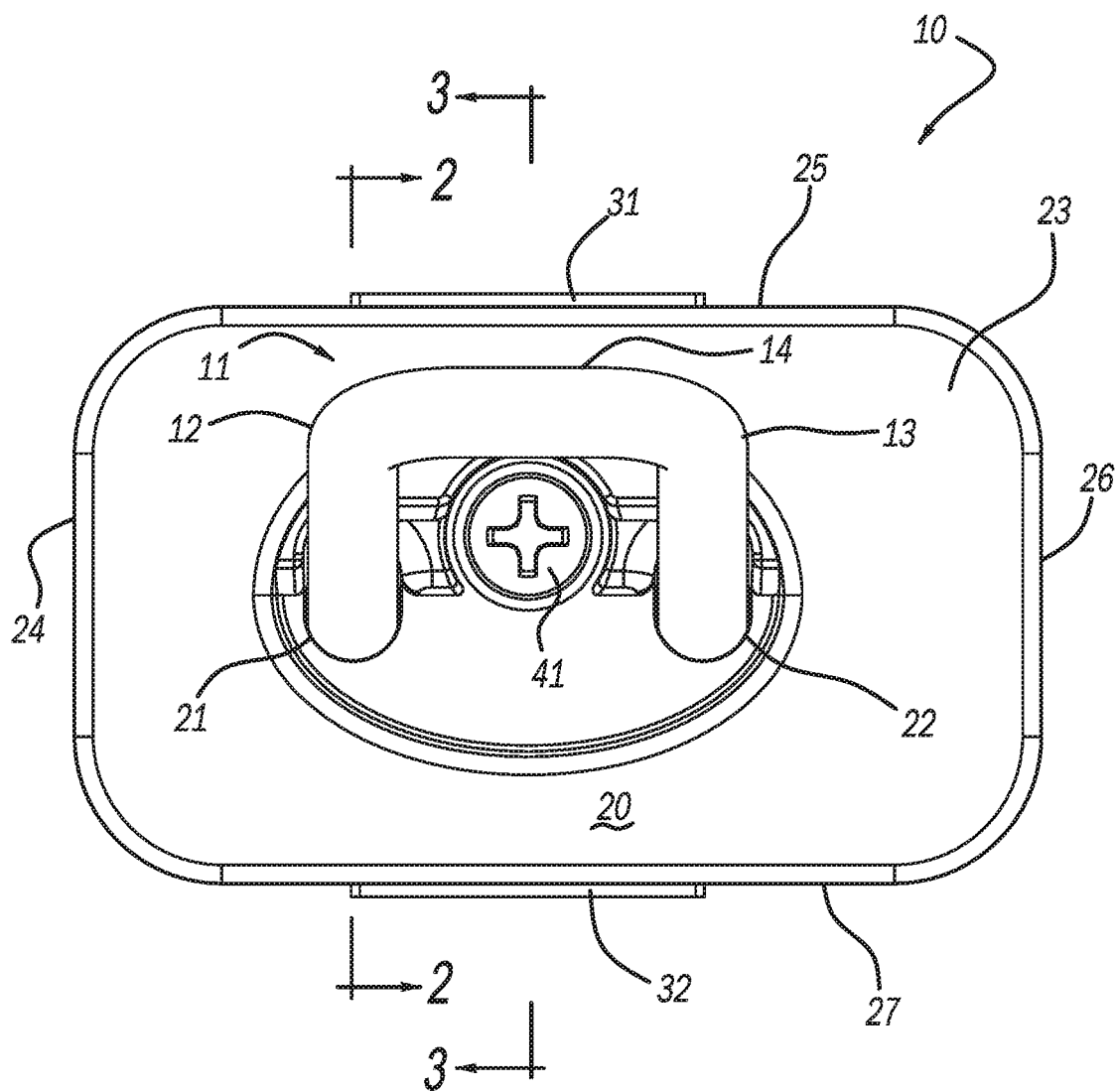
FIG. 1 is top plan view of a fastening ring assembly, in accordance with the present invention.
Figure 2:
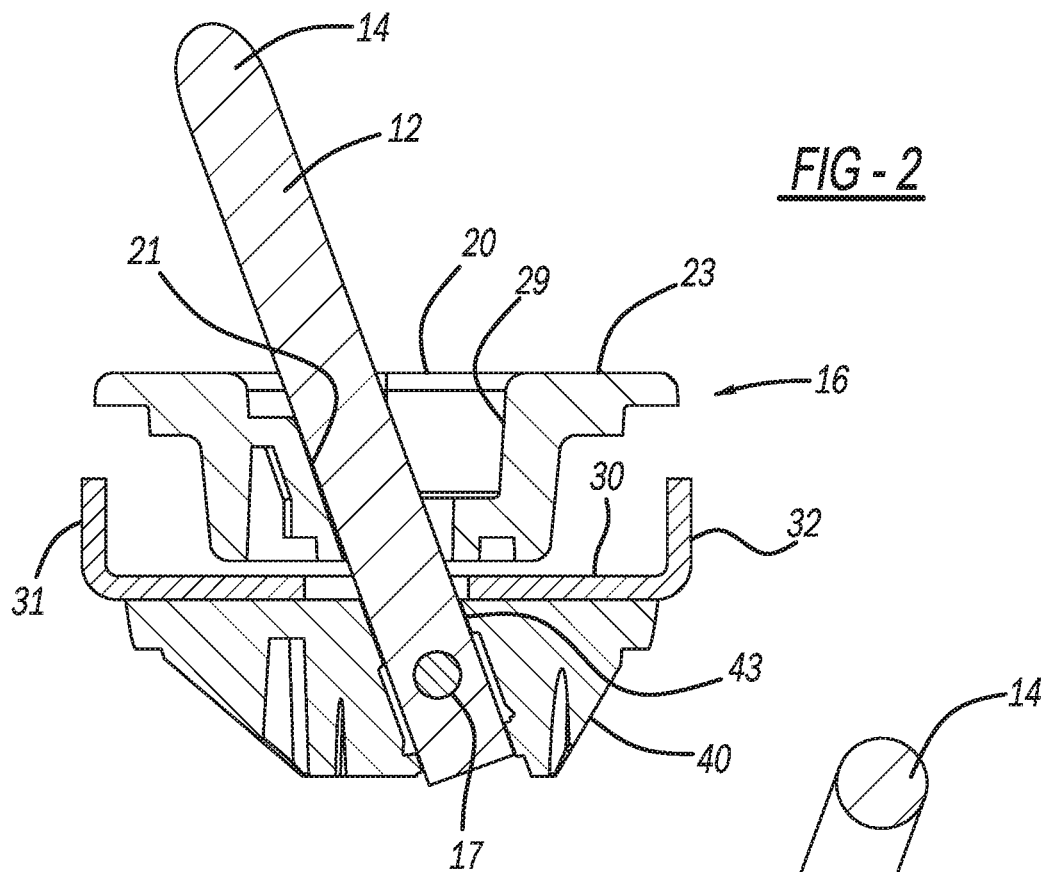
FIG. 2 is a side cross-sectional view along lines 2-2*ur*
Figure 3:
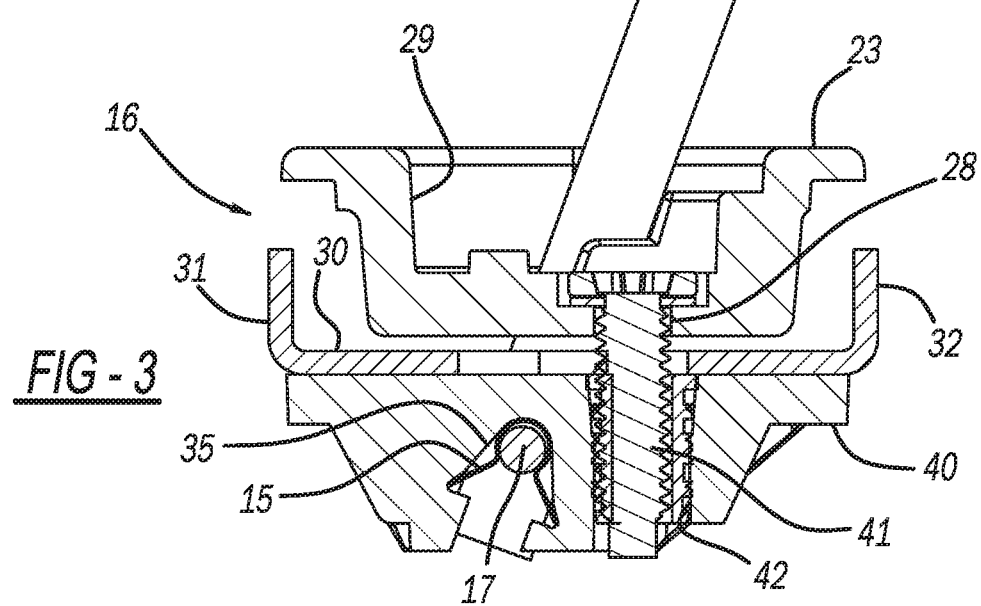
FIG. 3 is a side cross-sectional view along lines 3-3 in FIG. 1.

The anchor point assembly shown generally at 10 in FIG. 1 includes at least one anchor ring shown generally at 11 having legs 12 and 13 and top cross member 14, and at least one anchor ring housing shown generally at 16 in FIGS. 1-3. The housing 16 has a plurality of apertures. The legs 12 and 13 extend though the top member 20, preferably, through apertures 21 and 22 or openings in the top member 20. The top member 20 includes a generally rectangular flat upper portion 23 having longitudinal sides 25 and 27 and transverse sides 24 and 26. A recessed base portion 29 is integral with top member 20 for receiving the anchor ring 11 when the ring 11 is in a recessed position that is substantially flush with the flat upper portion 23 (see e.g. FIGS. 6-7). It is understood that any alternative suitable profiles are used depending on the particular application without departure from the scope of the present invention.

The anchor point 10 includes a retainer 30, e.g. retainer clip, and a bottom member 40 as show in FIGS. 2-3 and 6-8. The retainer clip 30 is typically made of a flat piece 33 of metal and upturned retaining and locking clips 31 and 32. The anchor ring housing 16 comprises the top plate member 20, retainer clip 30 and bottom member 40. A pair of apertures 45, 47 or openings through the retainer clip 30 are operably sized of a predetermined length for the legs 12, 13 to slide, preferably to slide at a predetermined angle, inside the housing 16 between the extension and retracted positions.

The bottom member 40 includes apertures 43, 44 or openings operably aligned with the apertures 21 and 22 for receiving the legs 12 and 13 so that the legs 12, 13 can slide generally upward and downward. A cross pin 17 extends between the legs 12 and 13 through openings 19, 19 formed in the legs 12, 13. The cross pin 17 is secured in the openings 19, 19 in the legs to hold the pin 17 in place and connect the legs 12, 13, the cross pin 17 acting as an extension stop relative to the housing 16 when the anchor ring 11 is deployed/extended/up. At least one retention device 15, e.g., spring clip 15, is operably secured within at least one recess 35 in the bottom member 40 and receives the cross pin 17 when the anchor ring 11 is fully extended to hold the anchor ring 11 in the extended position. The anchor ring 11 can be releasably held in the extended position shown in FIGS. 1-4 or pushed downwardly to release the cross pin 17 of the anchor ring 11 from the spring clip 15 to the stowed position shown in FIGS. 6-7, preferably substantially flush with the top surface of the top member 20.

At least one fastener 41, preferably a screw, extends through at least one opening 28 in the top member 20 and though an opening 46 in the retainer clip 30 and is operably connected to, preferably screwed into, the threaded portion 42 in the lower member 40 to hold the assembly 10 together.

In accordance with an aspect of the present invention, the openings 21, 22 in the top member 20, other openings 43, 44 in the bottom member and the recess 35 in the bottom member 40 are at a predetermined acute angle to the flat upper portion 23 as opposed to being perpendicular thereto. The ties, cords, straps or other tie downs that extend over a cargo load between opposing rings may be at an angle depending on the load. With the rings 11 at an acute angle, the force on the rings may only be a tension force and not a bending force, by way of example. By way of example, the angle is less than 90 degrees from vertical. Generally, the angle is about 75 degrees or less. Typically, the angle is about 15 to 80 degrees. Preferably, the angle is about 20 to 75 degrees. More preferably, the angle is about 50 to 75 degrees.

Alternately, the anchor ring 11 may be perpendicular to the top plate member 20 so the ring 11 slides up and down at substantially 90 degrees. A perpendicular anchor ring is shown in U.S. Pat. No. 9,511,705, which is incorporated herein by this specific reference thereto.

Figure 4:
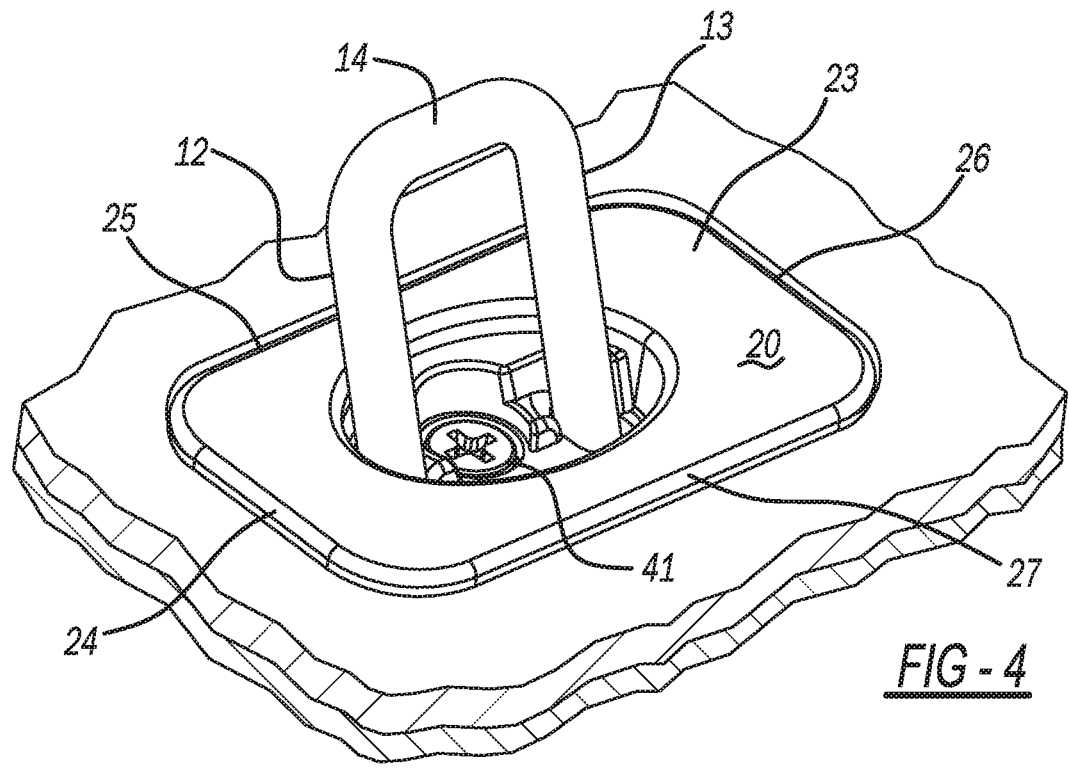
FIG. 4 is a top perspective view of the fastening ring installed in a truck bed.

As shown in FIGS. 1 and 4, the top plate member 20 is offset relative to the ring 11 so that a predetermined distance between opening 22 and side 26 is greater than a predetermined distance between opening 21 and side 24.

By way of example the distance from the center of the screw 42 head to the edge 24 of the top member 20 is at least about 1.5 inches, and the distance to the other edge 26 is more. By way of another example, the distance from the center of the screw 42 head to the edge 26 of the top member 20 is at least about 1.75 inches, and the distance to the other edge 24 is less. By way of yet another example, the distance from the screw to either edge 24 or 26 is at least about 0.25 inches less than the distance to the other of the edge 24 or 26. By way of example. The distance from the screw 42 and the edge 26 is at least about 1.75 inches, and the distance to the other edge 24 is a predetermined amount less, to provide an offset of the top member 20 relative to the ring 11. With the top plate member 20 being offset relative to the anchor ring 11, the top member's 20 length extends farther from the ring 11 on one side of the anchor ring 11 so as to fit flush with an opening in a hauling apparatus.

Figure 5:
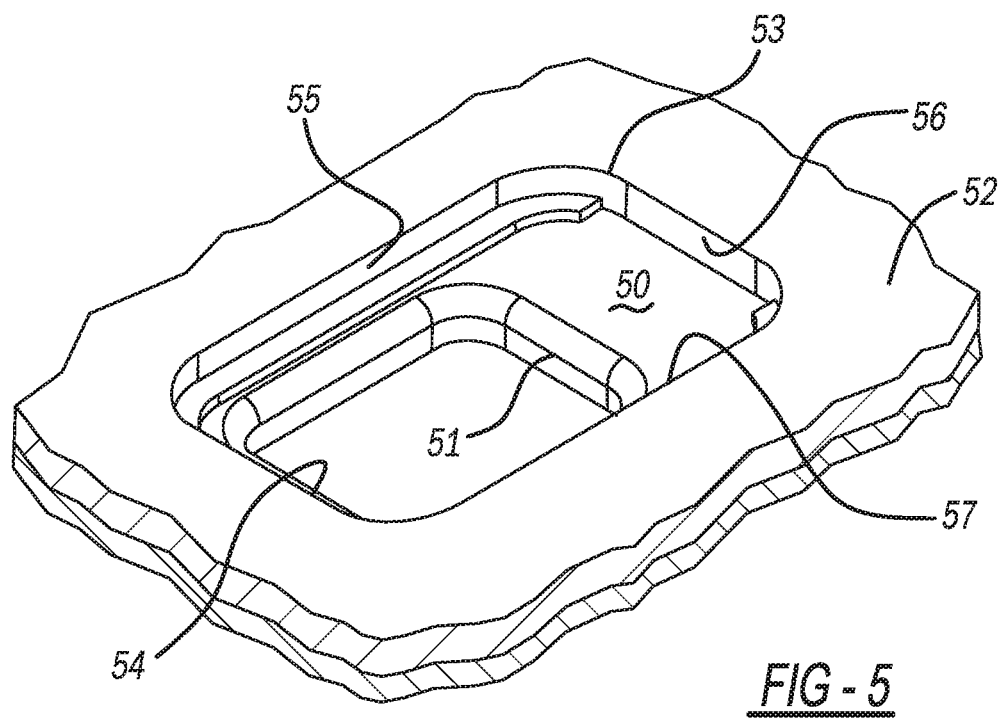
FIG. 5 is a top perspective view of the decorative cap and opening in a truck bed.
Figure 6:
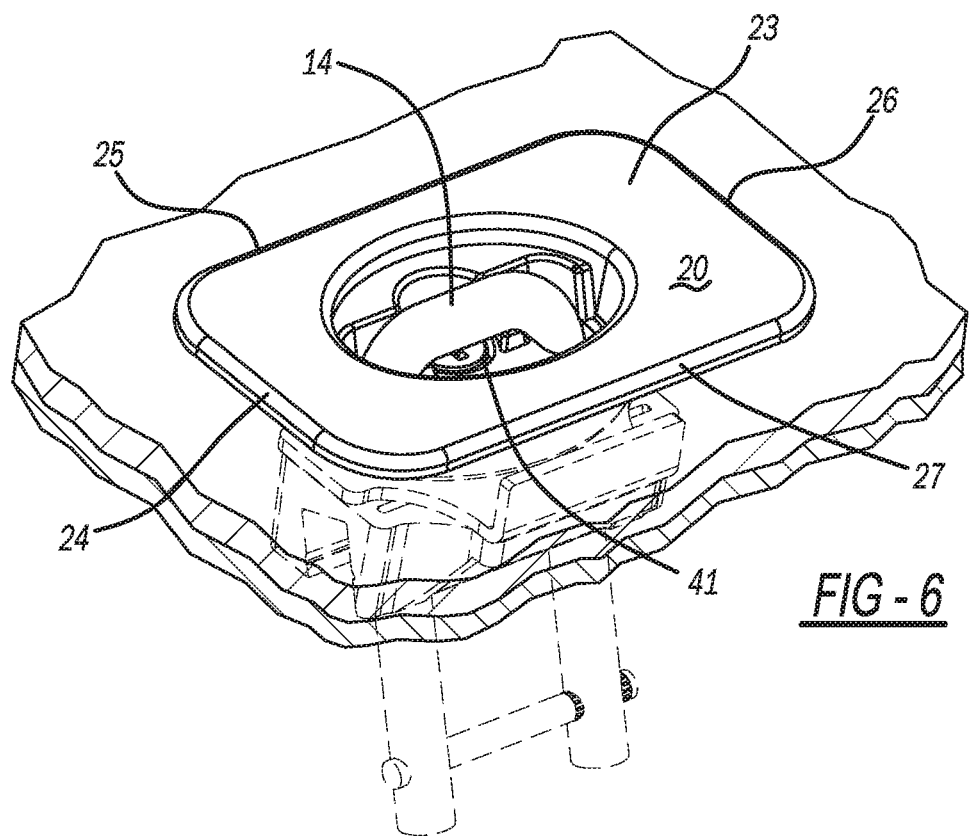
FIG. 6 is a top perspective view of the fastening ring, with legs shown in phantom, installed in the truck bed.
Figure 7:
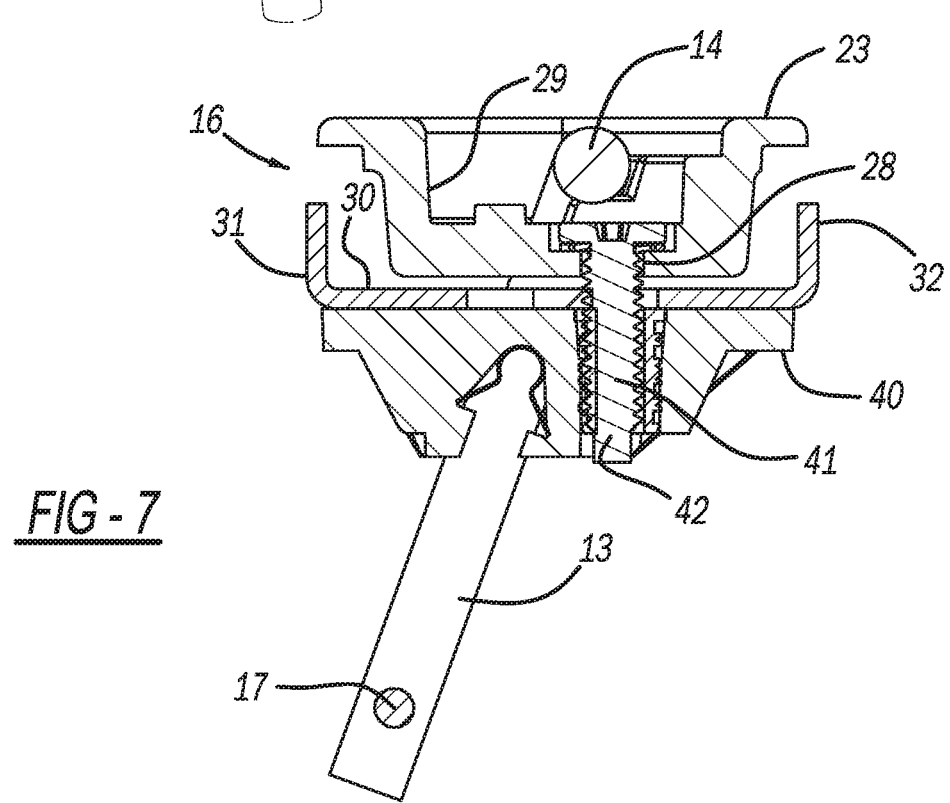
FIG. 7 is a side cross-sectional view of the fastening ring.
Figure 8:
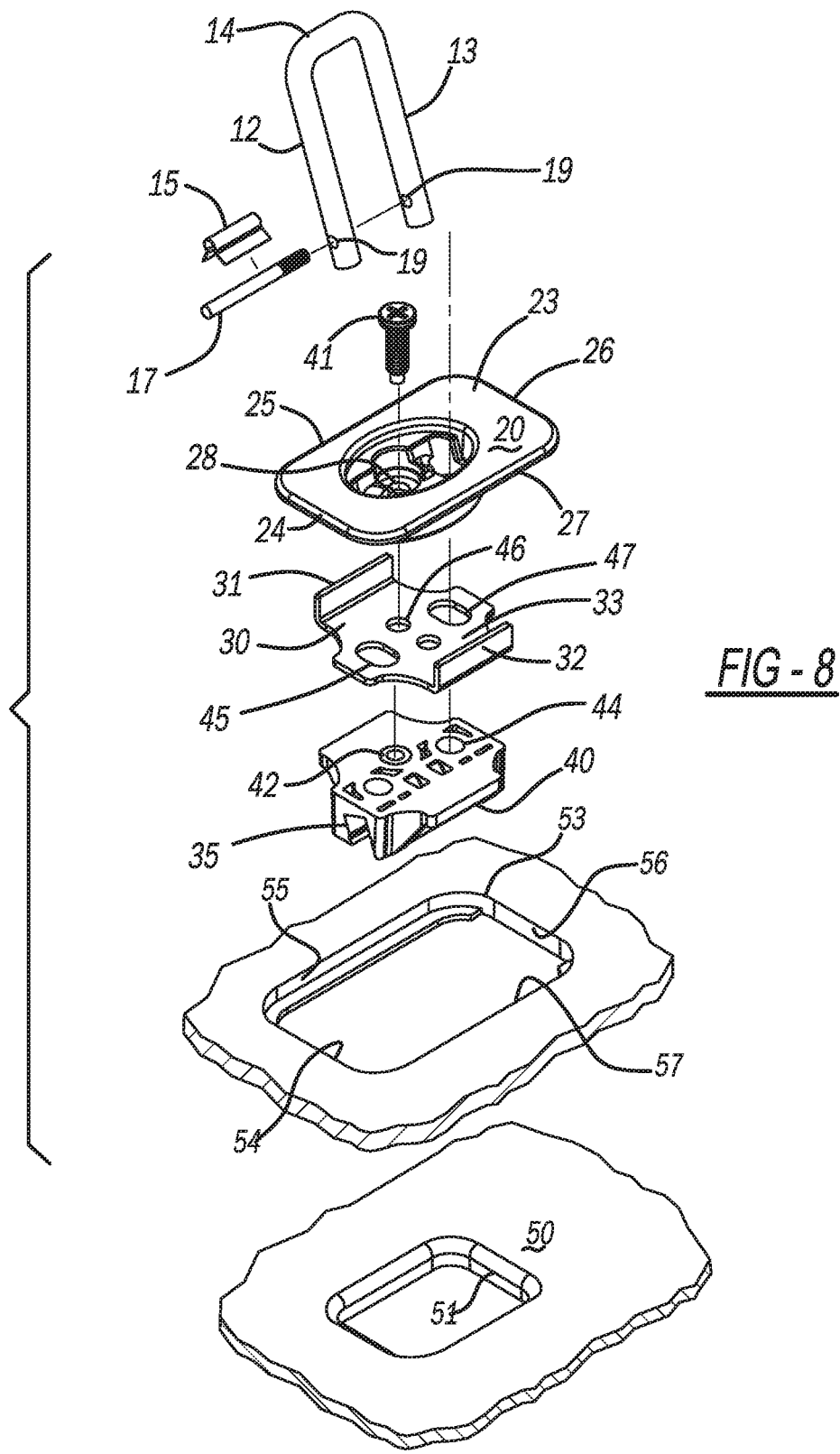
FIG. 8 is an exploded view of the fastening ring assembly and opening in a truck bed.

A reason for the offset upper flat portion 23 is depicted in FIG. 5. The upper rail 50 of the hauling apparatus, e.g. truck bed, side walls, has a generally square or rectangular opening 51. The rectangular offset opening 51 is larger than the bottom member 40 and retainer clip 30 of the anchor assembly 10 so that the bottom member 40 and retainer clip 30 may be inserted into the opening 51 and secured therein. By loosening the screw 41, the upturned sides 31 and 32 of the retainer clip 30 fit underneath the upper rail 50, engaging the lower surface thereof. A decorative cap 52 is operably secured to the upper rail 50 and includes a rectangular opening 53 having sides 54, 55, 56 and 57. The sides 24 and 54, 25 and 55, 26 and 56 and 27 and 57 allow the offset upper flat portion 23 to fit generally flush with the top of the decorative cap 52 when in place as shown in FIG. 4. This would not be possible if the upper flat portion 23 was not offset so that if would fit in the offset opening 51. Alternatively, the upturned edges 31 and 32 of the retainer 30 abut against the bottom surfaces of flanges or protrusions of the decorative cap 52 to secure the housing 16 in the upper rail 50.

The above-listed sections and included information are not exhaustive and are only exemplary of the invention. The sections and included information in an embodiment may depend upon the implementation and the included devices and resources. Although a system and method according to the present invention have been described relating to the preferred embodiment, it is not intended to be limited to the specific form set forth herein, but, on the contrary, it is intended to cover such alternatives, modifications, and equivalents, as can be reasonably included within the spirit and scope of the invention as defined by the appended claims.

The description of the invention is merely exemplary in nature and, thus, variations that do not depart from the gist of the invention are intended to be within the scope of the invention. Such variations are not to be regarded as a departure from the spirit and scope of the invention.

I claim:

1. An anchor point assembly mountable on a hauling apparatus, comprising:
   a housing including a plurality of apertures;
   an anchor ring slidably coupled to the housing adapted for extension of the anchor ring at a predetermined angle;
   a top plate member of said housing, said top plate member providing a predetermined offset where a predetermined length from one of the plurality of apertures to a first edge of the top plate member is a predetermined amount greater than a predetermined length from another of the plurality of apertures to an opposite second edge of the top plate member and the top plate fits flush within an opening of the hauling apparatus.

2. The anchor point assembly of claim 1, wherein the anchor ring includes a pair of legs slidable within the plurality of apertures of the housing.

3. The anchor point assembly of claim 2, wherein the top plate member is offset relative to the anchor ring so that the top plate member length extends farther from the anchor ring on one side of the anchor ring so the top plate member will fit flush in an opening in the hauling apparatus.

4. The anchor point assembly of claim 1, wherein the predetermined angle is about 15 to 80 degrees.

5. The anchor point assembly of claim 1, wherein the housing comprises the top plate member, a bottom member and a retainer between the top and bottom members, said anchor ring slidably coupled through each to selectively extend and retract the anchor ring.

6. The anchor point assembly of claim 5, further comprising at least one fastener that extends through another plurality of apertures formed in said housing, said at least one fastener drawing the bottom member in a direction toward the top plate member to hold the housing together.

7. The anchor point assembly of claim 1, wherein the housing further comprises a bottom member comprising a retention device that, when the anchor ring is pulled by a user in a first direction, receives and operably holds the anchor ring in a fully extended position, and, when the anchor ring is pushed by a user in a second direction, operably releases the anchor ring from the retention device to slide the anchor ring to a stowed position.

8. The anchor point assembly of claim 7, wherein the stowed position nests the anchor ring inside the housing flush to a cap operably attached to the hauling apparatus.

9. The anchor point assembly of claim 1, wherein the anchor ring further comprises a pin operably connected between two legs of the anchor ring, said two legs selectively slidable within the housing, wherein pulling the anchor ring in a first direction brings the pin into a clip located in an angled recess of the housing to hold the anchor ring in fully extended position, and, wherein pushing the anchor ring in a second direction releases the pin from the clip to slide the anchor ring to a stowed position flush with a top surface of the housing.

10. The anchor point assembly of claim 1, wherein the housing includes a retainer with at least a pair of upturned side edges operably adapted to fit against opposing surfaces of a rail adjacent an offset opening of the rail of the hauling apparatus.

11. The anchor point assembly of claim 1, wherein the housing includes a retainer that includes a pair of upturned clip members that abut against opposing bottom surfaces operably integrally formed with or secured to a rail of the hauling apparatus to retain the housing within an offset opening of the rail.

12. The anchor point assembly of claim 1, wherein the predetermined offset is at least about 0.25 inches in length in a longitudinal direction.

13. The anchor point assembly of claim 1, wherein the plurality of apertures comprises a pair of openings through the top plate member adapted to slidably couple a pair of legs of the anchor ring to the housing, and a pair of second openings through a bottom member of the housing adapted to slidably couple the pair of legs of the anchor ring to the housing, wherein the pair of openings and second pair of openings are aligned and at a predetermined acute angle relative to an outer upper surface of the top plate member to retain the anchor ring at the predetermined acute angle.

14. The anchor point assembly of claim 13, wherein the plurality of apertures further comprises a third pair of openings through a retainer located between the top plate member and bottom member, wherein the third pair of openings are operably sized to allow the pair of legs of the anchor ring to slide at the predetermined acute angle.

15. An anchor point for mounting on a hauling apparatus for securing a tie down line on an anchor ring, comprising:
    an anchor ring mounting in an anchor ring housing;
    the anchor ring housing having a top flat plate member;
    the top plate member being offset relative to the anchor ring so that the top plate member length extends farther from the anchor ring on one side of the anchor ring so the top flat plate member will fit flush in an opening in the hauling apparatus.

16. The anchor point of claim 15, wherein the top flat member is offset relative to the transverse centerline of the anchor ring so that the distance from the transverse centerline and a longitudinal side of the top flat plate member is greater than the opposed longitudinal side of the top flat plate member.

17. The anchor point of claim 15, wherein the anchor ring is oriented at an acute angle from the top flat plate member.

18. The anchor point of claim 15, wherein the anchor ring housing has a top plate member, retainer clip and a bottom member.

19. An anchor point for mounting on a hauling apparatus for securing a tie down line on an anchor ring, comprising:
    an anchor ring slidably mounted in an anchor ring housing;
    the anchor ring housing having a top plate member, retainer clip and a bottom member;
    the top plate member being offset relative to the transverse centerline of the anchor ring, anchor clip and bottom housing so that its longitudinal length extends farther from the anchor ring and anchor clip on one side of the anchor ring so it will fit flush in an opening in a hauling apparatus.

20. The anchor point of claim 19, wherein the anchor ring is oriented at an acute angle from the top flat plate member.

* * * * *